Feb. 3, 1970  TOMOYUKI HOSOKAWA ET AL  3,493,727
TEMPERATURE CONTROL DEVICE
Filed March 18, 1968  5 Sheets-Sheet 3

United States Patent Office 3,493,727
Patented Feb. 3, 1970

3,493,727
TEMPERATURE CONTROL DEVICE
Tomoyuki Hosokawa, Takarazuka-shi, Taro Yamamoto, Kyoto, Toshii Tsugeki, Kadoma-shi, Kazuya Kimura, Neyagawa-shi, Tokuzi Suga, Moriguchi-shi, Hiroshi Wada, Nara-shi, and Kunio Kimata, Nara-ken, Japan, assignors to Matsushita Electric Industrial Co., Ltd., Osaka, Japan, a corporation of Japan
Filed Mar. 18, 1968, Ser. No. 713,644
Claims priority, application Japan, Apr. 14, 1967, 42/24,126
Int. Cl. H05b 1/02
U.S. Cl. 219—505                    6 Claims

ABSTRACT OF THE DISCLOSURE

A temperature control device adapted to be used with an electric heater, such as an electric blanket, having a relatively large heating area, for controlling the temperature of said electric heater, said device including in its temperature control circuit, excluding a manually operative power switch, a thyristor, such as SCR, instead of ON-OFF control contacts, so as to regulate the current flowing through said contactless temperature control circuit by making use of a change in resistance with temperature of a thermo-sensitive control layer in a temperature detecting wire which is extending through the entire area of the electric heater, whereby the temperature of said electric heater can be adjusted variably and the temperature control device always operates on the safe side if it should become faulty.

---

The present invention generally relates to a temperature control device and more particularly relates to a temperature control device adapted to be used with an electric heater, such as an electric blanket, having a relatively large heating area, for controlling the temperature of said electric heater, which device includes in its temperature control circuit a thyristor to regulate the current flowing through said circuit by making use of a change in resistance with temperature of a thermosensitive control layer in a temperature detecting wire extending through the entire area of said electric heater, and with which the temperature of the electric heater can be variably adjusted.

An object of the present invention is to provide a temperature control device which is capable of controlling the temperature of an electric heater, e.g. an electric blanket, by detecting the temperature of said electric heater without using ON-OFF control contacts in its electric circuit excluding a manually operating power switch, and which will always operate on the safe side should it become faulty.

Another object of the present invention is to provide a temperature control device in which a pulse generating element, such as a neon lamp, is connected in parallel to a thermo-sensitive control layer interposed between temperature detecting wires to form a parallel circuit and a variable resistor is connected in series to said parallel circuit, so that by adjusting said variable resistor, the pulse generation in said neon lamp can be adjusted within the period of half a cycle and the temperature can be adjusted in a stepless fashion as desired by the user.

Still another object of the present invention is to provide a temperature control device in which a fusing layer is provided between a pair of heating wires, so that, when the heating wires are elevated locally to an abnormal temperature, the fusing layer may be fused shorting said heating wires with each other to ensure positive fusion of a current fuse.

Still another object of the present invention is to provide a temperature control device for an electric blanket, which has a temperature detecting wire arranged coarsely in a portion of said electric blanket corresponding to the body of the user and closely in a portion corresponding to the legs of the user and in the side portions of said blanket, so that said temperature detecting wire may be able to detect the temperature of said blanket independently of the body temperature of the user.

Still another object of the present invention is to provide a temperature control device, in which a diode is connected to the opposite ends of a heater, so that, when shorting occurs between the anode and the cathode of a thyristor, the heating wire may be shorted by said diode to cause fusion of a current fuse and thereby safety of the associated electric heater is ensured, said diode playing no role under the normal condition of the circuit.

Still another object of the present invention is to provide a temperature control device, in which a resistor and a condenser are connected in series between the anode and the cathode of a thyristor so as to prevent spontaneous triggering of said thyristor by a pulse wave from a power source accompanying a sharp voltage rise.

The present invention will be described in further detail by way of an embodiment thereof with reference to the accompanying drawings, in which.

Figure 1:
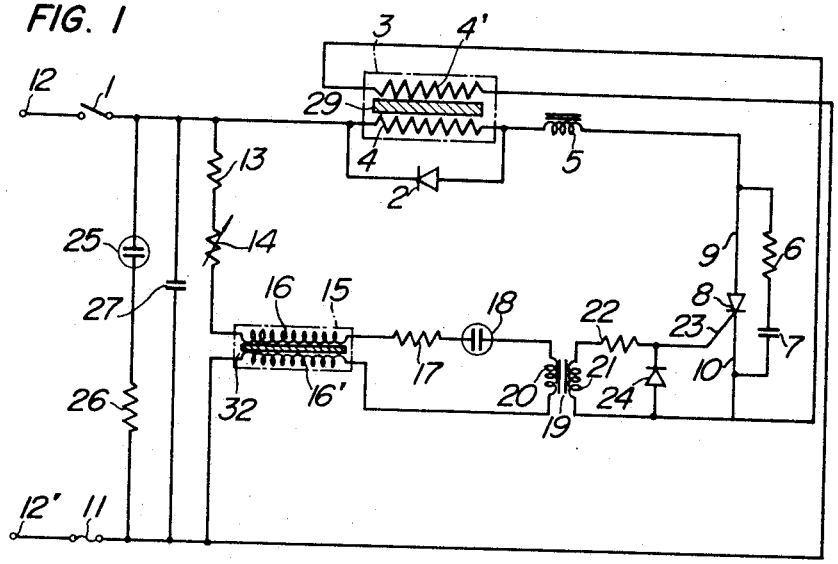
FIG. 1 is a wiring diagram of the temperature control device according to this invention.

Referring to FIG. 1, the electric circuit of the temperature control device is composed of a main circuit for conducting a current through a heater and a control circuit for controlling the current flowing through said heater. The main circuit comprises a manually operative power switch 1, a heating wire 4 of heater 3 extending in a blanket and having a diode 2 (200 v., 1.5 a.) connected thereto in parallel, a choke coil 5 (350 $\mu$h.), the anode 9 and the cathode 10 of a thyristor 8 (200 v., 2a.) having connected thereto in parallel a resistor 6 (10$\Omega$) and a condenser 7 (0.1 $\mu$f., 250 wv.) which are connected with each other in series, a heating wire 4' of said heater 3 and a current fuse 11 which is adapted to break the circuit when the amperage of the current flowing through the circuit becomes higher than a predetermined value, and all of these components are connected in series to both terminals 12 and 12' of an A.C. power source.

On the other hand, the control circuit comprises a fixed resistor 13 (100KΩ) having one end connected to the connection between the power switch 1 and the heating wire 4, a temperature adjusting variable resistor 14 (1MΩ) connected in series to said fixed resistor 13, a series circuit connected in series to said variable resistor 14 and comprising a detecting conductor 16 of a temperature detecting wire 15 for detecting the temperature of said blanket, a fixed resistor 17 (33KΩ), a neon lamp 18 to give a pulse to the circuit, the primary winding 20 (2KΩ) of a pulse transformer 19 and a detecting conductor 16' of said temperature detecting wire 15, said detecting conductor 16' being connected at one end to the connection between the aforesaid current fuse 11 and the heating wire 4'.

The secondary winding 21 (2KΩ) of the pulse transformer 19 has one end connected to the gate terminal 23 of the thyristor 8 through a fixed resistor 22 (820Ω) and the other end to the cathode 10 of said thyristor 8. A diode 24 (30 v., 35 ma.) is interposed between the gate 23 and the cathode 10 of the thyristor 8, with its anode connected to the cathode 10 and its cathode to the gate 23 of said thyristor.

A series circuit comprising a neon lamp 25 for indication of a current flowing through the circuit and a protective resistor 26 (150KΩ), has one end connected to the connection between the power switch 1 and the heating wire 4 and the other end to the connection between the fuse 11 and the heating wire 4'. A condenser 27 ( 0.1 μf., 250 wv.) is connected to the neon lamp 25 and the protective resistor 26 in parallel.

Figure 2:
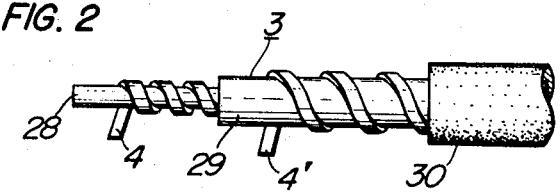
FIG. 2 is a fragmentary side elevation, partly broken away, of a heater used in the temperature control device.

Now, the construction of the heater 3 will be described with reference to FIG. 2. As shown, the heater is composed of a core 28 of heat-resistant electric insulating material, a heating wire 4 of conductive material, such as copper or copper alloy, wound around said core, a fusing layer 29 surrounding said heating wire 4 and formed of a material, e.g. nylon, vinyl or polyethylene, which is fusible at a predetermined temperature, another heating wire 4' wound around said fusing layer 29 and an outer sheath 30 of electric insulating material surrounding said heating wire 4'.

Figure 3:
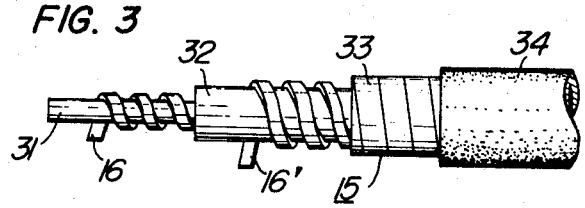
FIG. 3 is a fragmentary side elevation, partially broken away, of a temperature detecting wire used in the temperature control device.
Figure 4:
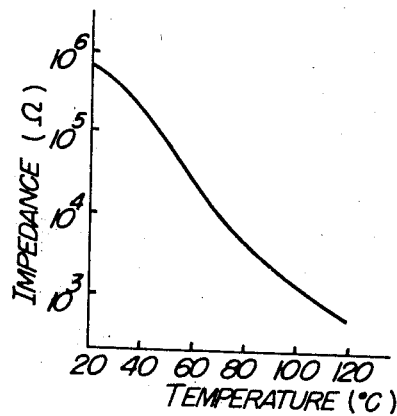
FIG. 4 is a chart illustrating the relationship between the temperature of a thermo-sensitive control layer in the temperature detecting wire and the impedance.

The temperature detecting wire 15, as shown in FIG. 3, is composed of a core 31 of heat-resistant electric insulating material, a detecting conductor 16 consisting of a nickel-plated wire or a stainless wire wound around said core 31, a thermo-sensitive control layer 32 surrounding said detecting conductor 16 and having a negative temperature resistance coefficient with which the impedance of said layer decreases sharply as the temperature rises as shown in FIG. 4, another detecting conductor 16' wound around said thermo-sensitive control layer 32, a coating layer 33 surrounding said detecting conductor 16' and formed of Mylar (trade name) or nylon which is capable of preventing emanation of a conductive plasticizer contained in the thermo-sensitive control layer 32, and an outer sheath 34 of vinyl, nylon or rubber surrounding said coating layer 33, said thermo-sensitive control layer 32 being formed of such a resin as polyvinyl chloride or polyamide added with the conductive plasticizer.

Figure 7:
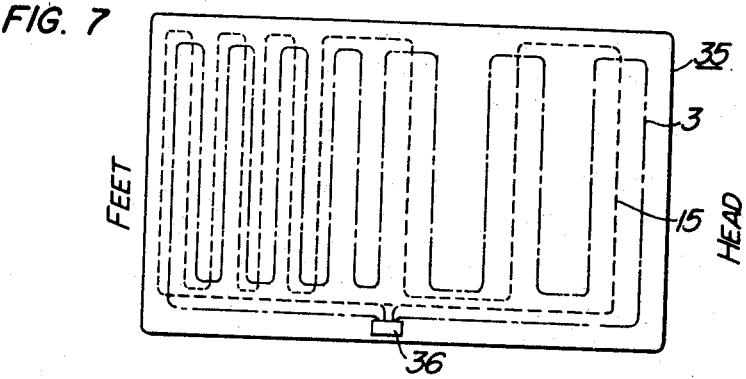
FIG. 7 is a diagrammatic view showing the arrangement of the heater and the temperature detecting wire in the electric blanket.

The arrangement of the heater 3 and the temperature detecting wire 15 in the body of the blanket is shown in FIG. 7. As seen, the density of the heater 3 in the body 35 of the electric blanket is progressively reduced from the feet region to the breast region in accordance with the principle of keeping the head cool and the feet warm. The temperature detecting wires 15 are arranged in said blanket body 35 for every 2 to 5 heaters 3.

The density of the temperature detecting wires 15 is also low in the breast and abdominal region and high in the feet region so as to obtain positive temperature control of the blanket by minimizing the undesirable influence of the body temperature of the user, particularly when the blanket is desired to be maintained at a temperature approximating the body temperature of the user, because obviously the temperature detecting wire 15, during use of the blanket, is heated not only by the heat from the heater 3 but also by the heat from the body of the user.

The heater 3 and the temperature detecting wires 15 are connected to a controller 38 through a cord outlet 36 in the blanket 35, a plug 36' and a cord 37, and to a power source through a cord 39 and a plug 40. The electric parts forming the electric circuit, shown in FIG. 1, are accommodated in the controller 38.

The temperature of the electric blanket of the construction described above will be controlled in the following manner. With the blanket being cool, when the manually operative power switch 1 is closed in half a cycle in which the terminal 12 is impressed with a positive voltage and the terminal 12' with a negative voltage, the control circuit composed of the power switch 1, fixed resistor 13, temperature adjusting variable resistor 14, detecting conductor 16, fixed resistor 17, neon lamp 18, the primary winding 20 of the pulse transformer 19, detecting conductor 16' and current fuse 11, is closed, so that the source voltage is partially impressed on the fixed resistor 13, variable resistor 14 and thermo-sensitive control layer 32 respectively. In this case, since the impedance of the thermo-sensitive control layer 32 is gerater than those of the fixed resistor 13 and the variable resistor 14, the source voltage is impressed on the thermo-sensitive control layer 32 causing the neon lamp 18 to discharge. In the occurrence of discharge in the neon lamp 18, the voltage drops about 10 volts from the discharge starting voltage to the discharge retaining voltage and thus a pulse is generated. The pulse thus generated is induced by the secondary winding 21 of the pulse transformer 19 and a signal current flows through the gate 23 of the thyristor 8, and the anode 9 and the cathode 10 of the thyristor 8 are electrically connected with each other. Consequently, a current flows through the main circuit composed of the power switch 1, the heating wire 4, the choke coil 5, the anode 9 and the cathode 10 of the thyristor 8, the heating wire 4' and the current fuse 11, heating the heater 3.

The thermo-sensitive control layer 32 interposed between the detecting conductors 16 and 16' may be construed as an equivalent circuit similar to a resistance and a distributed electrostatic capacity and, when the neon lamp 18 discharges with the distributed electrostatic capacity, regardless of the value of the variable resistor 14, a gate input required for conduction of the thyristor 8 can be obtained.

Figure 9A:
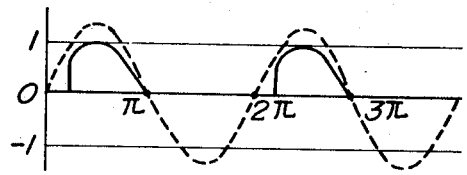
FIGS. 9a, 9b and 9c are diagrams each showing the state of the current flowing through a current fuse in each of the circuits shown in FIGS. 8a, 8b and 8c.

In another half cycle during which the power terminal 12 is impressed with a negative voltage and the terminal 12' with a positive voltage, a negative voltage is impressed on the anode 9 and a positive voltage on the cathode 10 of the thyristor 8. Therefore, the thyristor 8 is held in a non-conductive state and no current flows through the heater 3. The waveform of the current which flows through the heater 3 is shown in FIG. 9a.

As the blanket 35 is heated, the thermo-sensitive control layer 32 is heated accordingly, with the impedance between the detecting conductors 16 and 16' decreasing, and finally the voltage impresed on the neon lamp 18 drops below the discharge voltage. As a result, the neon lamp 18 stops the discharge and the current flowing through the primary winding 20 of the pulse transformer 19 is interrupted, so that no signal current is generated by the secondary winding 21 of said pulse transformer and no signal is given to the gate terminal 23 of the thyristor 8. The current flowing through the heater 3 is interrupted and the blanket 35 is no longer heated. The operation described above is repeated to maintain the temperature of the blanket 35 constant.

Figure 5:
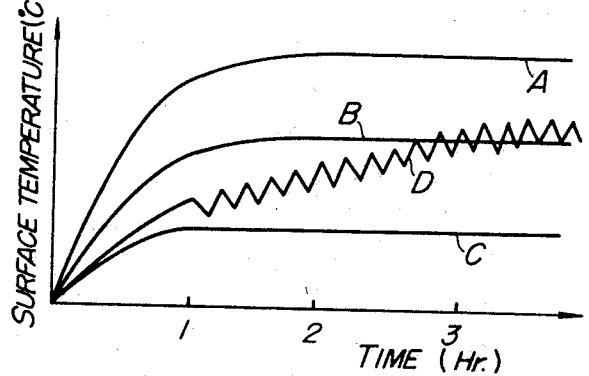
FIG. 5 is a chart illustrating the relationship between time and the temperature of an electric blanket in which the temperature control device of this invention is incorporated.

The temperature characteristics of the electric blanket 35 with the inventive control circuit incorporated therein are shown in the chart of FIG. 5. The temperature of the blanket can be set at an optional level such as a curve A, B or C, by adjusting the resistance value of the temperature adjusting variable resistor 14.

Figure 6:
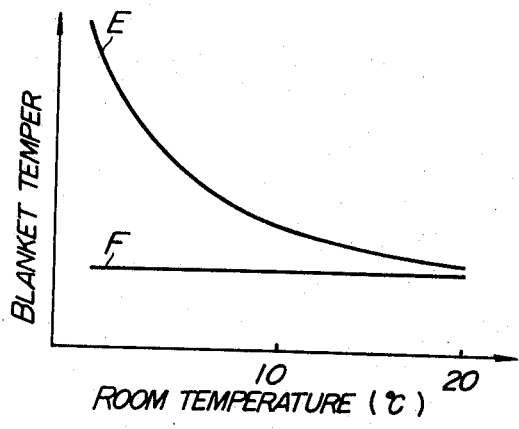
FIG. 6 is a chart illustrating the relationship between the room temperature and the temperature of the electric blanket.

The straight line F shown in the chart of FIG. 6 represents the temperature of the blanket, having the control circuit of this invention incorporated therein, with respect to varying room temperature. As is apparent from the chart, the blanket can be maintained at a set temperature independently of the varying room temperature and therefore the blanket is very comfortable to the user. In contrast thereto, the temperature of a conventional electric blanket of the type using a bimetallic contact and a heater, varies as the room temperature changes. Namely, the temperature of the conventiona blanket rises sharply as the room temperature lowers, as indicated by a curve E in the chart of FIG. 6, so that the blanket becomes excessively hot towards morning, giving an uncomfortable feeling to the user.

The condenser 27 in the electric circuit shown in FIG. 1, is provided to prevent a noise. This condenser 27 and the choke coil 5 will filter the pulse which will be generated at the moment the thyristor 8 is rendered conductive, and thereby avoid jamming of a radio, etc. by said pulse. They also protect the thyristor 8 against the electric waves generated by other electric appliances connected to the power source, so as to preevnt erroneous operation of said thyristor.

The diode 2 connected to both ends of the heater 3 plays no role under the normal operating condition of the circuit but, when shorting occurs between the anode 9 and the cathode 10 of the thyristor 8, it will short the heating wire 4 in the half cycle wherein 12' is impressed with a positive voltage, to increase the current flowing through the current fuse 11 so that said current fuse may be readily fused to assure safety of the blanket.

The resistor 6 and the condenser 7 connected in parallel to the thyristor 8 across the anode 9 and the cathode 10 thereof, serve to prevent spontaneous triggering of said thyristor caused by a pulse wave from the power source accompanying a sharp voltage rise.

Figure 8A:
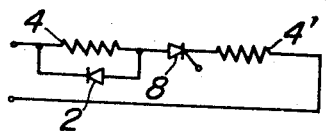
FIGS. 8a, 8b and 8c are wiring diagrams illustrating the functions of the safety means provided in the inventive device to deal with a failure of the thyristor in the heating circuit.
Figure 8B:
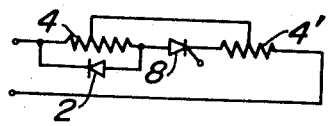
Figure 8C:
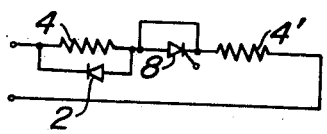
Figure 9B:
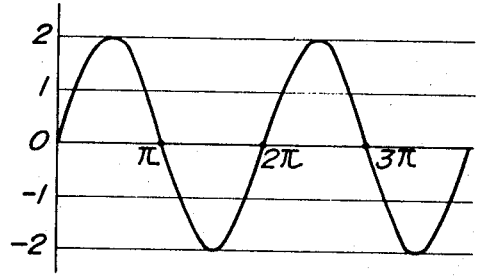
Figure 9C:
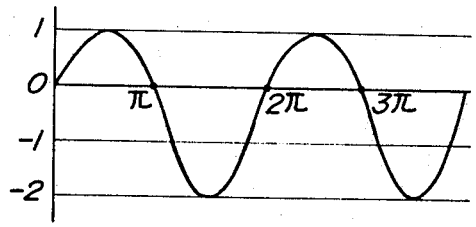

When the anode 9 and the cathode 10 of the thyristor 8 are shorted with each other of some reason, a heating circuit is formed as shown in FIG. 8c. The waveform of the current flowing through the current fuse 11 in this case is shown in FIG. 9c. Namely, in the half cycle wherein the power terminal 12 is positive and the terminal 12' is negative, the current flows through a circuit composed of the power switch 1, heating wire 4, choke coil 5, shorted thyristor 8, heating wire 4' and current fuse 11, whereas in the other half cycle wherein the power terminal 12 is negative and the terminal 12' is positive, the current flows through a circuit composed of the current fuse 11, heating wire 4', shorted thyristor 8, choke coil 5 and heating wire 4. Therefore, when representing the current by 1 which flows through the current fuse 11 in the first half cycle wherein the power terminal 12 is positive, the current flowing through the current fuse in the second half cycle wherein the power terminal 12 is negative, is twice as much as that in said first cycle. Collectively, the effective current flowing through the current fuse 11 in this case is about 2.2 times as much as that under the normal conditon, so that the current fuse 11 is fused at once, whereby firing of the electric blanket due to overheating can be prevented.

Now, when the heater 3 is locally overheated at a portion remote from the temperature detecting wire 15, overheating cannot be detected by said temperature detecting wire because of the arrangement of the heater 3 and the temperature detecting wire 15 in the blanket shown in FIG. 7. Therefore, the temperature of that portion of the heater 3 is further elevated and consequently the fusing layer 29 is fused shorting the heating wires 4 and 4' in the heater 3. The equivalent circuit of the heater circuit in this case is shown in FIG. 8b and the wave form of the current flowing through said circuit in FIG. 9b. The effective current flowing through the current fuse 11 in this case is about 2.8 times as much as that under the normal condition, so that the current fuse 11 is fused at once, protecting the blanket from the danger of fire.

The fusing temperature of the fusing layer 29 in the heater 3 is preferably within the range of 150° to 200° C. and therefore, the fusing layer is formed of such a resin as nylon 11, nylon 12, nylon 6 or nylon 610.

In the case of shorting of the detecting conductors 16 and 16' in the temperature detecting wire 15, the neon lamp 18 will not discharge no matter where the shorting occurs in said temperature detecting wire. Therefore, no signal is given to the gate terminal 23 of the thyristor 8 and no current flows through the heater 3.

When shorting occurs in the neon lamp 18, no pulse is given to the primary winding 20 of the pulse transformer 19. Therefore, a current of the power source frequency flows through the primary winding of said pulse transformer and accordingly a voltage of the same frequency is induced by the secondary winding 21 of said pulse transformer. However, since the voltage thus induced is not high enough to produce a gate input signal required for the conduction of the thyristor 8, no current will flow through the heater 3. But, when the resistance of the variable resistor 14 is close to the minimum value, the voltage of the secondary winding 21 of said pulse transformer produces a gate input signal required for the conduction of the thyristor 8 so that the current will flow through the heater 3. As will be understood from the foregoing description, the electric blanket with the inventive temperature control device incorporated therein will always act on the safe side and the same is true when the other parts become faulty in any condition.

Figure 10:
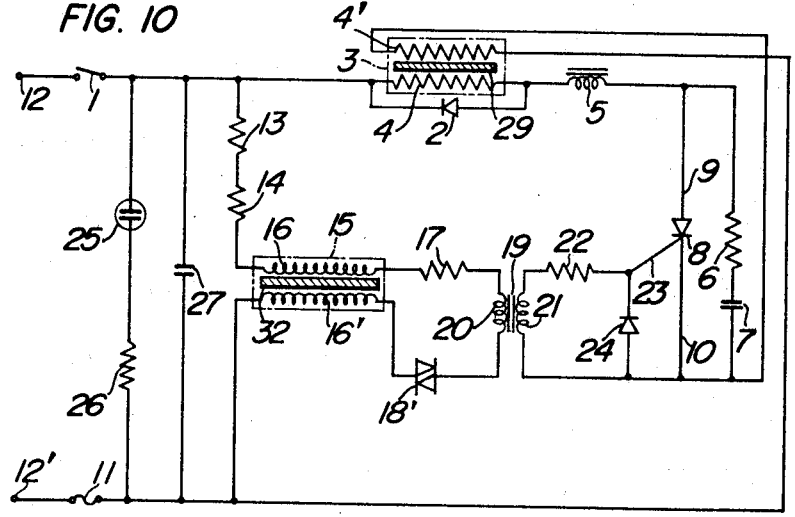
FIG. 10 is a wiring diagram of the inventive temperature control device in which a bi-directional element is used as a pulse generating element.
Figure 11:
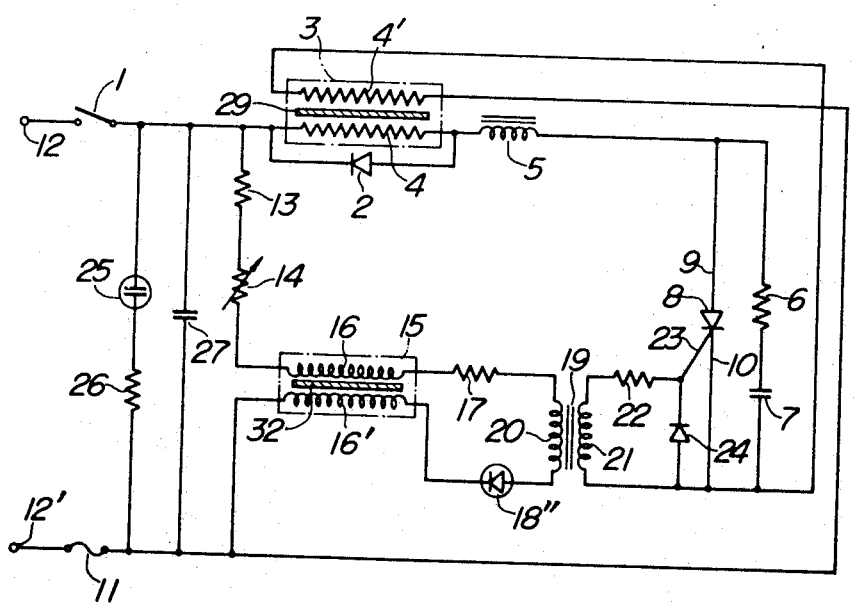
FIG. 11 is a wiring diagram, similar to FIG. 10, in which a Zener diode is used as a pulse generating element.

It is to be understood that a bi-directional element 18' and a Zener diode 18" may also be used as gate signal generating means as shown in FIGS. 10 and 11 respectively, with no substantial change in the operation described hereinabove.

What is claimed is:

1. A temperature control device characterized in that a heater and a thyristor are connected in series to both terminals of a power source and said thyristor has connected to the gate circuit thereof a series circuit composed of a temperature adjusting variable resistor, one of a pair of detecting conductors composing a temperature detecting wire and having interposed therebetween a thermo-sensitive control layer whose impedance is variable with temperature, a pulse generating element and another one of said pair of detecting conductors, whereby a power source voltage is divided in the ratio of the impedances of said variable resistor and said thermo-sensitive control layer and the voltage of said thermo-sensitive control layer is drawn to change the conducting angle of said thyristor for controlling the current flowing through the heater.

2. A temperature control device according to claim 1, in which said thyristor is of a unidirectional type and a diode is connected in parallel to said heater with its polarities arranged opposite to the conducting direction in said thyristor.

3. A temperature control device according to claim 1, in which said heater is composed of a pair of heating wires and a fusing layer interposed between said heating wires, so that if the temperature of said heater should be locally elevated to an abnormal level at a portion at which the temperature of the heater cannot be detected by the temperature detecting wire, said fusing layer may be fused to short the heating wires.

4. A temperature control device according to claim 1, in which said temperature detecting wire is arranged in an electric blanket coarsely in a portion corresponding to the breast and abdominal regions and closely in a portion corresponding to the feet of the user, so as to minimize the undesirable influence of the body temperature of the user on said wire.

5. A temperature control device according to claim 1, in which a resistor and a condenser are connected in series across the anode and the cathode of the thyristor so as to preclude malfunction of said thyristor caused by an external noise.

6. A temperature control device comprising a main circuit composed of a pair of heating wires having a fusing layer interposed therebetween, a thyristor such as a silicon controlled rectifier having one end connected in series to one of said pair of heating wires and the other end connected in series to the other one of said pair of heating wires, a diode connected in parallel to said one of the heating wires and adapted to flow a current therethrough only in a direction opposite to the current flowing direction in said thyristor, and a condenser inserted between the anode and the cathode of said thyristor; and a control circuit composed of a pair of detecting conductors having a resistor element of negative temperature characteristic interposed therebetween, a pulse generating element connected in series to one of said pair of detecting conductors, the primary winding of a pulse transformer having one end connected in series to said pulse generating element and the other end connected in series to the other one of said pair of detecting conductors, and a temperature adjusting variable resistor connected in series to said other one of the detecting conductors, said main circuit and said control circuit being connected in parallel to a power source and the secondary winding of said pulse transformer having one end connected to the gate and the other end connected to the cathode of said thyristor.

References Cited

UNITED STATES PATENTS

| | | | |
|---|---|---|---|
| 2,611,854 | 9/1952 | McNairy | 219—505 |
| 2,745,943 | 5/1956 | Safford | 219—505 |
| 2,846,559 | 8/1958 | Rosenberg | 219—506 |
| 2,846,560 | 8/1958 | Jacoby et al. | 219—505 |

BERNARD A. GILHEANY, Primary Examiner

F. E. BELL, Assistant Examiner